United States Patent
Richards et al.

(10) Patent No.: US 7,523,359 B2
(45) Date of Patent: Apr. 21, 2009

(54) APPARATUS, SYSTEM, AND METHOD FOR FACILITATING MONITORING AND RESPONDING TO ERROR EVENTS

(75) Inventors: Paul Matthew Richards, Tucson, AZ (US); Brian Anthony Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 11/095,062

(22) Filed: Mar. 31, 2005

(65) Prior Publication Data

US 2006/0230306 A1    Oct. 12, 2006

(51) Int. Cl.
    G06F 11/00    (2006.01)
(52) U.S. Cl. .......................................... 714/49; 714/57
(58) Field of Classification Search ............. 714/47–49, 714/26, 57
    See application file for complete search history.

(56) References Cited

U.S. PATENT DOCUMENTS

| | | | | |
|---|---|---|---|---|
| 5,615,135 | A * | 3/1997 | Waclawsky et al. | 702/182 |
| 6,044,479 | A * | 3/2000 | Dell | 714/48 |
| 6,282,173 | B1 * | 8/2001 | Isonuma et al. | 370/242 |
| 6,708,296 | B1 * | 3/2004 | Gover et al. | 714/47 |
| 6,754,854 | B2 * | 6/2004 | Kurrasch | 714/47 |
| 6,778,491 | B1 * | 8/2004 | Fourcand et al. | 370/217 |
| 6,934,885 | B2 * | 8/2005 | Gabele et al. | 714/33 |
| 6,948,098 | B2 * | 9/2005 | Pillay et al. | 714/34 |
| 6,959,403 | B2 * | 10/2005 | Dierauer et al. | 714/49 |
| 7,000,154 | B1 * | 2/2006 | LeDuc et al. | 714/47 |
| 7,020,808 | B2 * | 3/2006 | Sato et al. | 714/47 |
| 7,036,049 | B2 * | 4/2006 | Ali et al. | 714/47 |
| 7,249,288 | B2 * | 7/2007 | Peled et al. | 714/47 |
| 7,269,764 | B2 * | 9/2007 | Dart et al. | 714/54 |
| 7,272,754 | B2 * | 9/2007 | Love et al. | 714/47 |
| 7,295,526 | B2 * | 11/2007 | Guanter et al. | 370/310 |
| 2002/0198983 | A1 * | 12/2002 | Ullmann et al. | 709/224 |
| 2004/0103350 | A1 * | 5/2004 | Pham | 714/704 |
| 2005/0005202 | A1 * | 1/2005 | Burt et al. | 714/47 |

* cited by examiner

*Primary Examiner*—Joshua A Lohn
(74) *Attorney, Agent, or Firm*—Kunzler & McKenzie

(57) ABSTRACT

An apparatus, system, and method are disclosed for facilitating monitoring and responding to error events. An apparatus may includes a set of counters associated with a processing system resource, each counter associated with an error event and having attributes defining a count value, counter thresholds directly related to time, and empirical status information for the error event related to time. A user may adjust counter thresholds indirectly to set an error tolerance. An update module may update counters within the set based on an error event for the processing system resource. The management module persists and maintains a life cycle for counters based on counter attributes. Each counter may be of two types either a fixed counter that counts error events from a start time for a defined duration or a sliding counter that counts error events up to a predefined number of error events within a window of time.

16 Claims, 6 Drawing Sheets

APPARATUS, SYSTEM, AND METHOD FOR FACILITATING MONITORING AND RESPONDING TO ERROR EVENTS

BACKGROUND OF THE INVENTION

1. Field of the Invention

This invention relates to error event tracking and handling in a computer system and more particularly relates to an apparatus, system, and method for facilitating monitoring and responding to error events.

2. Description of the Related Art

Computer and information technology continues to progress and grow in its capabilities and complexity. In particular, data storage systems continue to evolve to meet the increasing demands for reliability, availability, and serviceability of the physical data storage system and its hardware, software, and various other components. Data storage systems often handle mission critical data. Consequently, data storage systems are expected to remain on-line and available according to a 24/7/365 schedule. Furthermore, data storage systems are expected to handle power and service outages, hardware and software failures, and even routine system maintenance without significantly compromising the reliability and availability to handle data Input/Output (I/O) from hosts.

Generally, hardware components used in computer systems, such as storage systems, are inexpensive but prone to unpredictable and/or sporadic failure referred to as an error event. The error event may result in loss of system availability, data integrity, or both. To maintain high availability, even in view of hardware failures, modern computer systems include redundant hardware components to provide either more capabilities and/or redundant capabilities. These hardware components are often referred to as Field Replaceable Units (FRUs).

Error recovery techniques have been developed to recover lost or corrupted data and/or restore the hardware experiencing the error event to a reliable operating state. As a single hardware component continues to experience error events, error recovery modules may mark the hardware for replacement during a subsequent service call for the computer system.

Consequently, in conjunction with error recovery functions, error recovery software has tracked error events using simple counters that increased when each error event occurred. These simple counters provide some general information regarding the reliability of a hardware component. For example, a high value for the simple counter can indicate a general failure of the hardware component. Generally, these counters begin recording error events once the hardware component is powered and online. The counters continue to register error events until the hardware component is reset, power cycled, or fenced meaning the hardware component is taken offline either logically or physically, or replaced. When a counter satisfies a threshold, error recovery is initiated on that hardware component. The counters include no information regarding frequency for specific time periods between when the counter starts monitoring and when the counter is reset, just a total error event count.

Unfortunately, simple counters do not provide sufficient information to accurately determine cause and effect for error events. For example, a host adapter may signal an error event due to data corruption because of a faulty processor which signals its own error event. However, examining the error event counters for the processor and the host adapter may not indicate such a relationship. In addition, simple counters are generally stored in non-persistent memory such that power cycling the memory effectively resets the counters. Consequently, error event relationships between power cycles are undetectable.

In addition, simple counters are traditionally maintained as data within software code implementing error recovery. Consequently, adding or removing counters related to new error events requires modification of the error recovery code and vice versa. Furthermore, traditional counter thresholds are hard coded and not configurable by an end-user. Typically, this is due to hardware warranty concerns as well as a concern that the end-user does not have an appreciation of the proper level for a particular counter threshold.

The static nature and lack of relationships between traditional counters to each other or to specific points in time, severely limits the ability of traditional counters to indicate correlations between error events on different hardware components and/or a single hardware component over time. Relating error events to time may permit reasonable explanations for counters exceeding thresholds. For example, maintenance may have been performed when the counter threshold was crossed. Consequently, the error event may be human caused rather than actual hardware failure.

From the foregoing discussion, it should be apparent that a need exists for an apparatus, system, and method that facilitates monitoring and responding to error events. Beneficially, such an apparatus, system, and method would count error events in relation to time, count a plurality of error events in relation to a single hardware component, provide different threshold levels that trigger different degrees of error recovery, preserves certain counters between resets and system failures, permits end-users to adjust threshold levels indirectly based on predefined historical and empirical information, and permits counting of error events in relation to a sliding window of time.

SUMMARY OF THE INVENTION

The present invention has been developed in response to the present state of the art, and in particular, in response to the problems and needs in the art that have not yet been fully solved by currently available error event trackers. Accordingly, the present invention has been developed to provide an apparatus, system, and method that facilitates monitoring and responding to error events that overcome many or all of the above-discussed shortcomings in the art.

The apparatus to facilitate monitoring and responding to error events is provided with a logic unit containing a plurality of modules or components configured to functionally execute the necessary steps. These modules or components in the described embodiments include a set of counters, an update module, and a management module.

The apparatus, in one embodiment, includes a set of counters associated with a processing system resource, each counter associated with an error event and having attributes defining a count value, one or more counter thresholds directly related to time, and empirical status information for the error event in relation to time. The update module may update one or more counters within the set in response to an error event for the processing system resource. The management module persists and maintains a life cycle for one or more counters based on the attributes. The attributes may define the life cycle for the counter. Each counter may be of two types either a fixed counter configured to count error events from a defined start time for a defined duration or a sliding counter configured to count error events up to a predefined number of error events within a window of time measured from a most recent error event. The sliding counter counts error events that occur within the window of time.

The apparatus is further configured, in one embodiment, to include an error tolerance module, a query module, a storage module, and an initialization module. The error tolerance module is configured to adjust the counter thresholds for one or more counters by applying a predefined factor to the thresholds. Alternatively, the counter thresholds are adjusted to predefined values in response to an error tolerance level set by an end-user. The query module queries one or more sets of counters in response to an error event query, the query directed toward a logical grouping of processing system resources. The storage module selectively stores a persistent copy of the counters in the set on a redundant processing system, on a storage device, in response to one of an error recovery action, and in response to a processing system shutdown. The initialization module initializes the counters in accordance with pre-defined counter prototypes associated with each counter, each counter prototype based on historical, empirical, statistical information related to an error event.

In a further embodiment, an update module of the apparatus includes a determination module and a threshold module. The determination module may selectively signal one or more counters to update in response to an error event notification from an error event analysis module. The threshold module may send a threshold notification to an error recovery module in response to satisfaction of one of the thresholds for one of the counters, the apparatus operating independent of the error event analysis module and error recovery module.

A system of the present invention is also presented to facilitate monitoring and responding to error events. The system, in one embodiment, includes error event analysis module, an error tracking module, an error recovery module, and one or more processing system resources configured to communicate one or more error indicators to the error event analysis module. The error event analysis module may determine an error event based on one or more error indicators, the error event associated with a processing system resource. The error tracking module may include an update module, a threshold module, and a management module configured like similar modules within the apparatus described above. The error recovery module configured to selectively execute an error recovery action in response to a threshold notification.

The system may further include a host management console configured to query the error tracking module to determine an overall error status for the computer processing system, to make a service call in response to a service call message from the error recovery module, and to interface with the error tolerance module in response to user input from an end-user. The system may also include other modules and components similar in functionality to those described above in relation to the apparatus.

A method of the present invention is also presented to facilitate monitoring and responding to error events. The method in the disclosed embodiments substantially includes the steps necessary to carry out the functions presented above with respect to the operation of the described apparatus and system. In one embodiment, the method includes associating a set of counters with a processing system resource, each counter comprising attributes defining the counter, a count value, one or more counter thresholds directly related to time, and context information for an error event, updating one or more counters within the set of counters in response to an error event for the processing system resource, and managing one or more counters such that persistence of the one or more counters is maintained in accordance with the attributes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
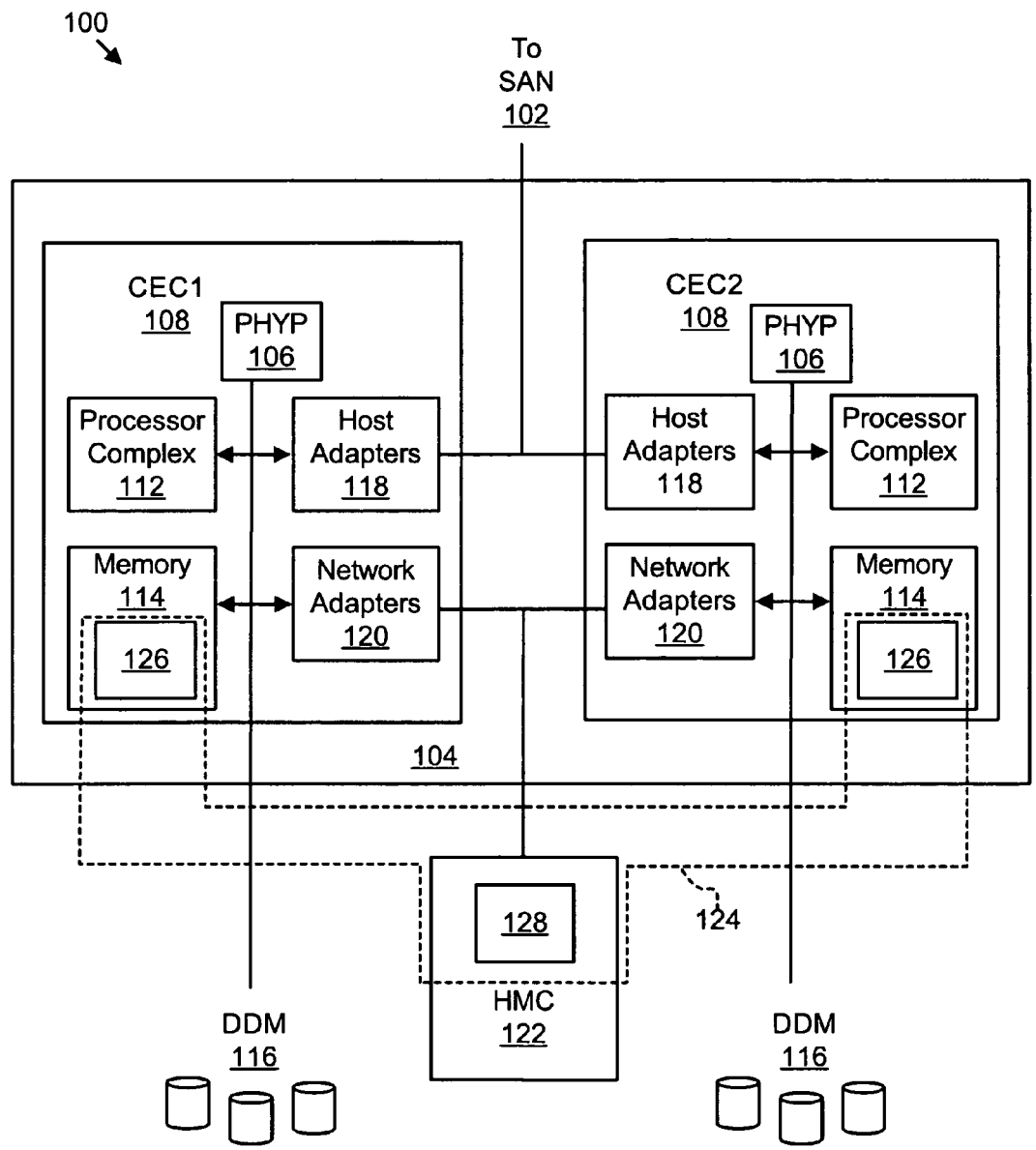
FIG. 1 is a schematic block diagram illustrating one embodiment of a processing system suitable for use with embodiments of the present invention.

FIG. 1 illustrates a representative processing system 100 suitable for use with the present invention. The processing system 100 may comprise a storage subsystem 100 configured to service I/O requests from hosts connected to a Storage Area Network 102 (SAN). One example of a storage subsystem 100 suitable for use with the present invention is an IBM Enterprise Storage Server® available from International Business Machines Corporation (IBM) of Armonk, N.Y.

To provide reliability, availability, and redundancy, the storage subsystem 100 may include two redundant hardware platforms referred to herein as Central Electronic Complexes (CECs) joined by a common hardware platform 104. The common hardware platform 104 may comprise a simple physical enclosure. A CEC is an independent collection of physical computing devices connected to a common coordination module 106, such as a Hypervisor (PHYP) 106.

A CEC 108, 110 includes a plurality of symmetric multiprocessors organized in a processor complex 112, a plurality of electronic memory devices 114, a plurality of storage devices also known as a Disk Drive Module (DDM) 116, a plurality of network I/O interface devices 118, such as host adapters 118, and a plurality of management interface devices 120, such as network adapters 120. The host adapters 118 and network adapters 120 may support high speed communication protocols such as Fibre Channel. Of course, various other host adapters 118 and network adapters 120 may be used to support other protocols including, but not limited to, Internet Small Computer Interface (iSCSI), Fibre Channel over IP (FCIP), Enterprise Systems Connection (ESCON), Infini-Band, and Ethernet.

The CEC 108, 110 includes a power coupling and power infrastructure as well as a ventilation and cooling system. Each CEC 108, 110 can be power cycled independently. Even certain subsystems can be power cycled without affecting performance of other parts of the CEC 108, 110. Of course those of skill in the art will recognize that certain hardware devices described above may be organized into subsystems and include various controllers not relevant to the present invention but that enable the CEC 108, 110 to properly function.

The platform 104 may include a first CEC 108 and a second CEC 110. Preferably, the second CEC 110 includes substantially the same quantity, type, brand, and configuration of hardware as the first CEC 108. Having common hardware reduces the variables involved in troubleshooting a problem and provides redundancy. In one embodiment, the first CEC 108 and second CEC 110 may be managed and controlled by a single Hardware Management Console (HMC) 122 connected via the network adapters 120. The HMC 122 may be a dedicated hardware management device such as a personal computer running a LINUX operating system and suitable management applications.

Preferably, the system 100 includes an error recovery system 124 configured to count and recover from error events in accordance with embodiments of the present invention. Preferably, data structures and logic 126 for counting error events are loaded into memory 114 for each CEC 108, 110 and error event recovery and analysis logic 128 is loaded onto the HMC 122. The separation of counting logic 126 and error recovery logic permits the counting logic 126 to be readily adapted, ported, and configured for a variety of processing systems. Conventional, as well as modern error recovery systems, can interact with the counting logic 126. In addition, systems not related to error recovery may use the counting logic 126.

The error recovery system 124 is configured to provide counters that are related to specific time periods including fixed time periods as well as time periods defined by a window of time. The window of time may slide forward in response to a new error event or in response to passage of time. In addition, the counters are pre-initialized using prototypes that encapsulate the historical and empirical failure rate information for the particular components of the CEC 108, 110 associated with counters. Furthermore, the error recovery system 124 permits an end-user to adjust the sensitivity of the thresholds associated with the counters without directly setting threshold values. In this manner, warranty requirements can be maintained while providing flexibility to an end-user regarding error tolerance for a CEC 108, 110. These aspects and others are described in more detail below in relation to FIGS. 2-6.

Figure 2:
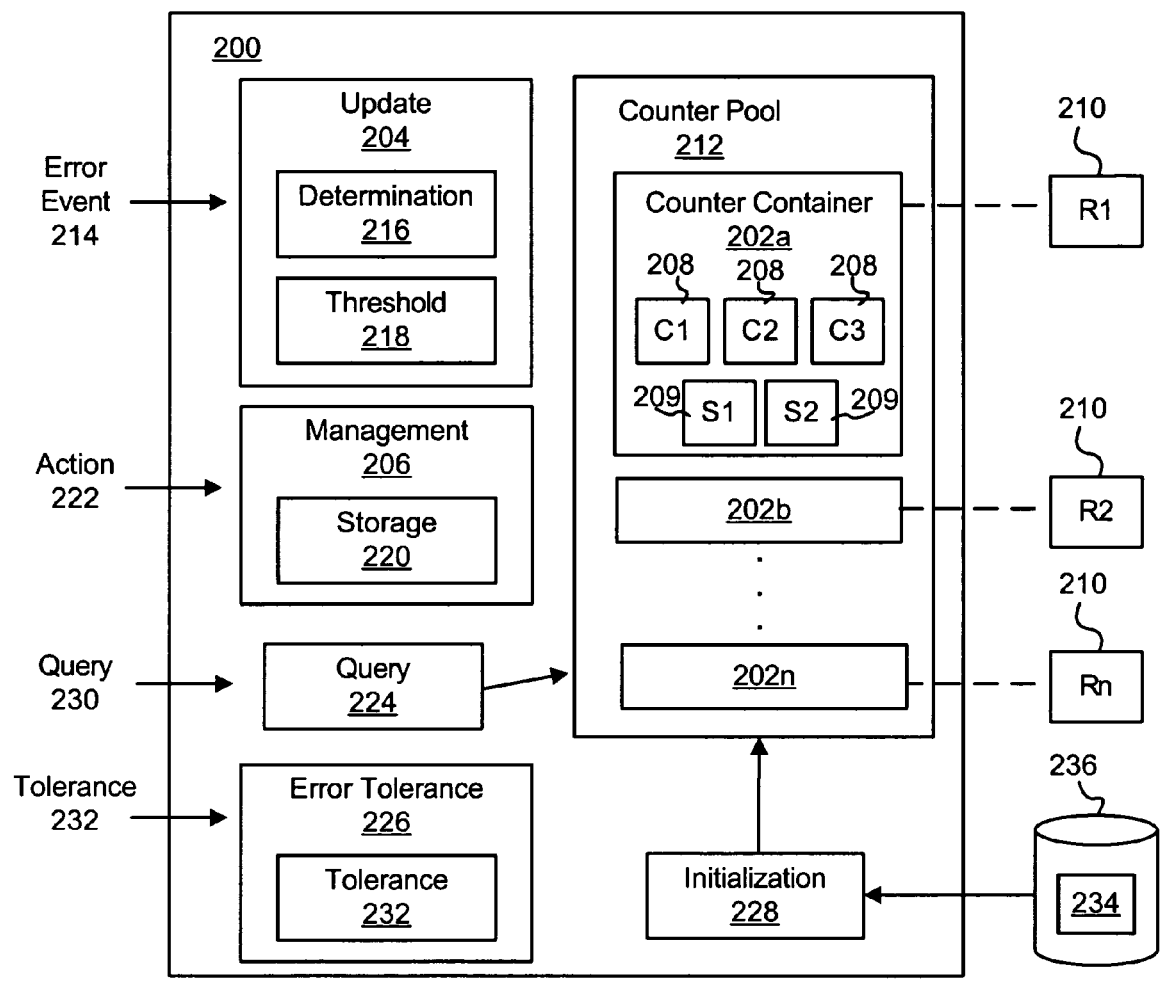
FIG. 2 is a schematic block diagram illustrating one embodiment of an apparatus in accordance with the present invention.

FIG. 2 illustrates one embodiment of an apparatus 200 for facilitating monitoring and responding to error events. The apparatus 200 includes a set of counters 202, an update module 204, and a management module 206. Preferably, the set of counters 202 are organized into a counter container 202. The counter container 202 associates (indicated by the dashed line) a set of counters 202 with a processing system resource 210. The counter container 202 may associate the counters 208 using various data structures including linked lists, stacks, arrays, tables, and the like.

As used herein, a processing system resource 210, or simply resource 210, refers to a distinct independently identifiable component of the processing system. Preferably, the processing system resource 210 is a hardware component such as a FRU. Some examples of processing system resources 210 include processors, host adapters, network adapters, memory modules, DDMs, and the like. Alternatively, or in addition, the processing system resource 210 may comprise a software module.

Each counter 208 may be associated with a particular error event related to the processing system resource 210. Examples of error events may include expired timeouts for a response from the resource 210, data structures or data corrupted by the resource 210, erroneous data provided by the resource 210, and the like. As described in more detail below, each counter 208 includes a count value, one or more count thresholds, and empirical status information. In certain embodiments, the count thresholds and empirical status information is related to time intervals.

In one embodiment, the counter container 202 includes a specialized form of a counter 208 referred to as a summary counter 209. A summary counter 209 tracks error events related to the associated counters 208 but is defined such that an overall tally may be retained even if the counters 208 are expired or reset. Preferably, the summary counter 209 is updated when one of the associated counters 208 is updated. Typically, a summary counter 209 spans a longer period of time than the associated counters 208. For example, a summary counter 209 may be associated with each counter 208 in a counter container 202 such that the summary counter 209 maintains a count of all error events, of any type for a particular resource 210. A summary counter 209 may be associated with one or more regular counters 208. A summary counter 209 may be associated with counters 208 within a counter container 202 or between counter containers 202.

Preferably, the counter container 202 includes substantially all the counters 208 for error events associated with a particular resource 210. Typically, because resources 210 are often duplicated for redundancy, the associated counters 208 are also duplicates, the difference being which particular resource 210 the counter 208 is associated with. The counter container 202 facilitates keeping counters 208 associated with a particular resource 210 individually accessible without any naming conflicts or confusion.

Preferably, the apparatus 200 supports a plurality of counter containers 202*a-n* each associated with a resource 210. The counter containers 202*a-n* may be defined within a counter pool 212. A counter pool 212 comprises a single data structure for all the sets of counters 202. The counter pool 212 serves as a storage location for the counters 208 and counter containers 202. Preferably, storage space in the counter pool 212 is not allocated to a counter container 202 and counter 208 until at least one counter 208 is instantiated for a resource 210.

Typically, the counter pool 212 is stored in non-persistent memory. As discussed more below, the counter pool 212 provides a convenient structure for quickly backing up, relocating, or copying all the counters 208 and counter containers 202 in a single operation.

The update module 204 updates one or more counters 208 in response to an error event 214, also referred to as an error event notification. The error event 214 may relate directly to a particular resource 210 or to a class of resources 210. A determination module 216 analyzes the error event 214 and determines based on indicators in the error event 214 which counters 208 are affected.

Preferably, the counters 208 are implemented as software objects such that the determination module 216 can send an update signal to the appropriate counter objects 208. In response to the update signal, the counters 208 include the functionality to act on the update signal and change the count value. Those of skill in the art will recognize that an update can include an increase in the count value or a decrease in the count value.

In one embodiment, once update signals have been sent, a threshold module 218 determines whether any thresholds for any of the counters 208 has been satisfied. This can be accomplished in different ways all within the scope of the present invention. In one embodiment, the threshold module 218 queries each counter 208 or at least each counter 208 that received an error event update. Any counter 208 for which a threshold has been satisfied may then respond by sending a signal to the threshold module 218. Alternatively, the counter 208 may independently signal the threshold module 218 in response to the update signal. Those of skill in the art recognize that these signals may comprise inter-object messages, function calls, event messaging, or the like. Having received a signal that a threshold has been satisfied, the threshold module 218 may send a threshold notification to an error recovery module (illustrated in FIG. 3).

The management module 206 persists and maintains a life cycle for each counter 208. As described below, the counters 208 may include various different attributes. One of these attributes defines how persistent the counter 208 should be. Persistent, as used herein, refers to the act of preserving the definition and state of the counter 208 regardless of events that otherwise would reset or cause the loss of the definition and state of the counter 208. An example of non-persistence is, power cycling the system or subsystem in which the counter 208 is stored in non-persistent memory 114. As a result, the state of the counter 208 would be lost.

In one embodiment, the management module 206 employs a storage module 220 to store a persistent copy of one or more counters 208 to protect the counters 208. The management module 206 may selectively store all counters 208 by storing a copy of the counter pool 212. Alternatively, the management module 206 may store persistent copies of selected counters 208 based on a setting of an attribute of the counter 208. Depending on the configuration of the processing system, the storage module 220 may selectively store the persistent copies in various locations including on a persistent or non-persistent storage or memory device of a redundant processing system, on a storage device such as a DDM 116, on a backup storage device, or the like.

The storage module 220 may selectively store the persistent copies periodically, in response to a user command, or in response to an action message 222. The action message 222 may relate to the processing system or an error recovery action. For example, during a processing system shutdown, the storage module 220 may be notified and store a persistent copy of select counters 208 in response. Alternatively, an error recovery action may cause the memory 114 storing the counters 208 to be reset or power cycled. Consequently, the storage module 220 may store the persistent copy. In certain embodiments, the storage module 220 also restores the counters 208 to an earlier state once the action 222 is completed. For example, after a processing system (i.e., CEC 108) is back online, the storage module 220 may restore certain counters 208 from a storage device 116 (DDM).

In addition, certain counters 208 may include attributes defining when the counter 208 is to be reset. For example, a counter 208 tracking data corruption may "live" beyond a recovery action that reinitializes data structures of a resource 210 but be required to "die" or "expire" when the resource 210 is power cycled. Based on the action message 222, the management module 206 causes the counter 208 to survive re-initialization and expire after a power cycle of the resource 210.

Beneficially, the storage module 220 permits use of counters 208 that survive recovery actions that would otherwise reset the counters 208. In this manner, certain counters 208 may be associated with the life of the resources 210. Consequently, more robust error tracking information and correlations between error events can be obtained by examining the counters 208

In certain embodiments, the apparatus 200 includes a query module 224, an error tolerance module 226, and an initialization module 228. The query module 224 enables a software module (not shown) to send an error event query 230. The error event query 230 comprises a request for information related to the counters 208. Preferably, the query 230 is formatted according to a query language such as Structured Query Language (SQL). Alternatively, the query 230 may simply indicate a resource 210 and request all counter information for counters 208 associated with that resource 210.

In response to the query 230, the query module 224 communicates with the appropriate counters 208 to gather the desired information. The query module 224 may then return the information in various formats including objects, lists, data streams, or the like. In addition, the query module 224 may provide results in response to queries directed toward logical groupings of processing system resources. For example, rather than provide a list of all host adapters 210 in the query 230, the query 230 may simply request a total count of data corruption on any host adapter 210. The query module 224 evaluates the query 230, communicates with the counters 208, and returns the results. Of course those of skill in the art will recognize that the query 230 and query module 224 may be as simple or complex as needed to provide error event information and error event correlation information to a requesting software module. The modular nature of the query module 224 facilitates use of the apparatus 200 in various counting contexts.

The error tolerance module 226 adjusts counter thresholds for one or more counters 208 based on a tolerance level set by the end-user. A counter threshold is a value in the counter 208 that defines a reference point in relation to an event such as an error event. If the number of error events equals or passes the threshold, certain actions such as error recovery should be taken. Typically, the counter value and the threshold values are actual numerical values. Permitting an end-user to set the threshold value directly may be unreasonable as the end-user may not have a clear understanding as to the proper magnitude of the counter value before that value indicates a serious problem.

For example, a Cyclic Redundancy Check (CRC) may occur on a track of data sent from a host, or inside the adapter memory. A reasonable value for the CRC threshold may be 20 errors in 30 minutes before a fence action is performed. The fencing action is disruptive to the host system I/O if too many occur at the same time. Without such knowledge, a performance-cautious end user with redundant host adapters may set the CRC counter threshold at 2 every 30 minutes which triggers early replacement of the adapter card (and therefore minimizes disruption of host I/O with intermediate recovery actions). A liberal end-user may set the threshold at 60 errors every 30 minutes, potentially resulting in data loss but useful for system testing and integration.

Either direct threshold setting set forth in the example may be unreasonable. Consequently, the error tolerance module 226 may permit the user to set a tolerance level 232 instead of setting the threshold directly. In one embodiment, direct setting of the threshold is insulated from the user selected tolerance level by applying a factor to the threshold rather than a direct change of the threshold. For example, suppose five tolerance levels 232 are defined: no error event tolerance, moderate tolerance, average tolerance, semi-liberal tolerance, and liberal tolerance. Each tolerance level 232 may correlate to a factor such as 1, 50%, 100%, 150%, 200%. The tolerance module 226 may apply the tolerance level 232 to the actual counter threshold value. Suppose an end-user selects a moderate tolerance level either for the CRC counter 208 specifically or for all counters 208. The tolerance module 226 ensures that the CRC counter threshold is satisfied when the number of CRC error events meets or exceeds 50% of the actual threshold value or 10 errors (20*0.5) every 5 minutes. Above is a simple example for illustration, those of skill in the art will recognize that the factor and method of applying the factor may be more complex if needed.

Alternatively, the tolerance levels 232 may correspond to a predefined set of values for the counter 208. In the example above, the five tolerance levels 232: no error event tolerance, moderate tolerance, average tolerance, semi-liberal tolerance, and liberal tolerance may correlate to respective values of 1, 10, 20, 30, and 40. The predefined values may be set by a programmer familiar with the historical and empirical error event rates for the particular resource 210. The tolerance module 226 may then adjust a threshold for a particular counter to one of these predefined values.

Advantageously, the tolerance module 226 insulates the thresholds from unknowledgeable end-users while still allowing the end-user some control over the thresholds. In certain embodiments a single tolerance level 232 may be applied to each threshold of active counters 208. Alternatively, a plurality of tolerance levels 232 may apply to groups of counters such as those for a particular counter container 202.

The initialization module 228 initializes the counters 208 when the counters 208 are first created or reset by the management module 206. Conventional counters are typically initialized by setting counter values to an initial starting point such as zero. In contrast to conventional counters, the counters 208 in accordance with the present invention are more complex, as will be described in relation to FIG. 4. Consequently, the counters 208 include more than just counter values that need to be reset. Other settings might include clearing of timestamps, setting of one or more threshold values and any associated time factors related to the threshold values.

In certain embodiments, the initialization module 228 initializes counters 208 based on pre-defined counter prototypes 234. A storage device 236 may store the counter prototypes 234. A counter prototype 234 is a model counter having predefined values that can serve as initial values for a newly defined counter 208 of a particular type. Preferably, a different counter prototype 234 exists for each type of counter 208. In one embodiment, the type of counter 208 is identifiable by its associated error event and resource type.

Advantageously, a counter prototype 234 can incorporate the historical, empirical, and statistical information currently available with regard to a particular resource 210 and a particular error event. This wealth of information is used to define the threshold values and/or the time periods associated with the threshold values. In addition, other attributes of a counter 208 may be set by values defined in a counter prototype 234. Preferably, the counter prototypes 234 are defined by engineers that specialize in error recovery and are well familiar with the error event behavior for the particular resource 210. In this manner, human intelligence and experience is incorporated into the counters 208 such that error event counting is more robust and reliable. In addition, incorporating this information into the counters 208 allows for most indicators that are used to identify an error event can be discarded. Instead, counter prototypes 234 can be updated as historical information and experience dictates.

Figure 3:
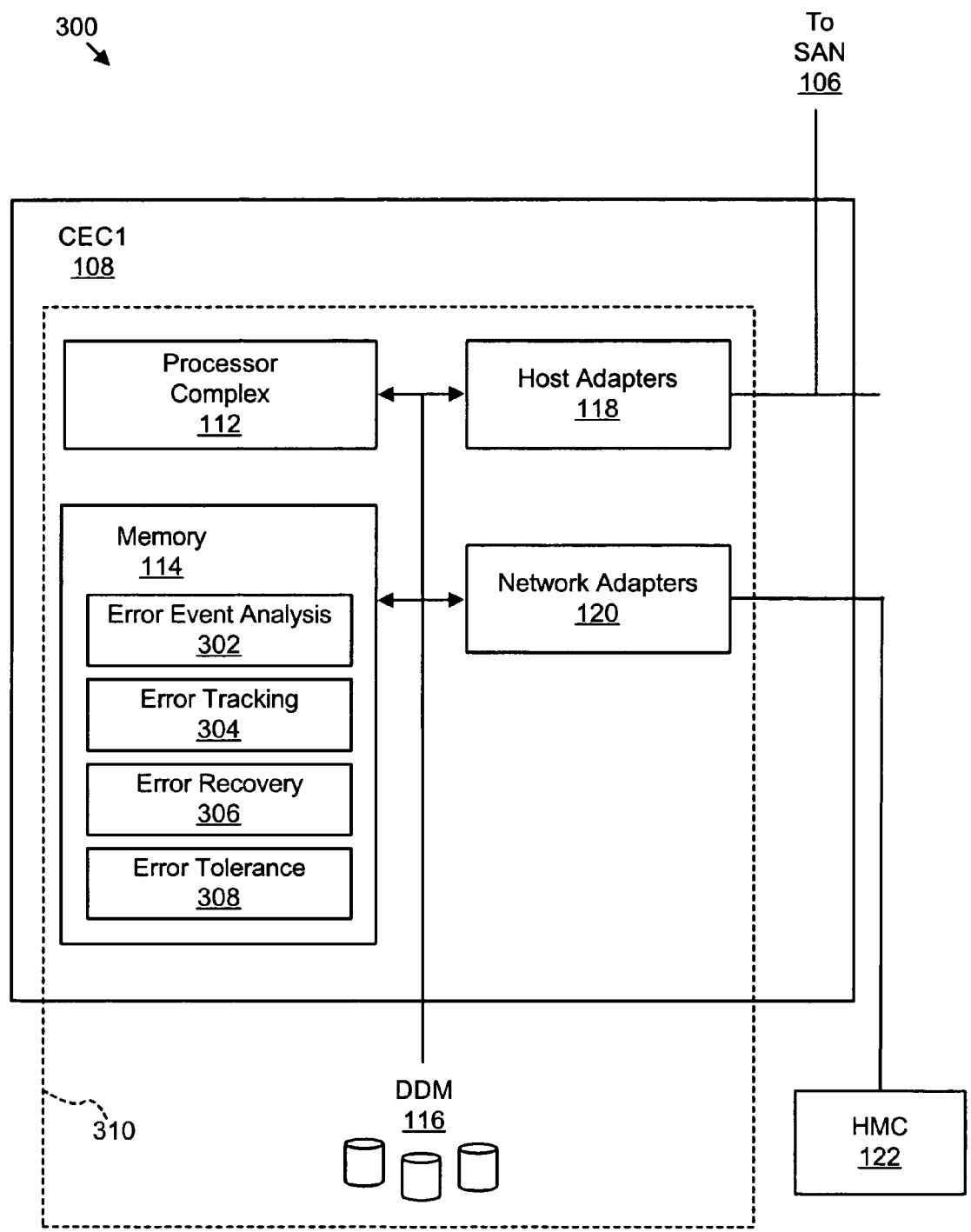
FIG. 3 is a schematic block diagram illustrating one embodiment of a processing system that includes one embodiment of the present invention.

FIG. 3 illustrates a system 300 for facilitating monitoring and responding to error events according to one embodiment. The system 300 may include hardware components similar to those described above in relation to FIG. 1. The similar hardware components include the same numbers as those in FIG. 1. Furthermore, the memory 114 may be adapted to error event analysis, tracking, and recovery.

In one embodiment, the memory 114 is loaded with an error event analysis module 302, and error tracking module 304, error recovery module 306, and an error tolerance module 308. Preferably, the modules 302, 304, 306, and 308 are modular and a configured to communicate with each other through message and notification passing. The error event analysis module 302 determines that an error event for a processing system resource 310 has occurred based on or more error indicators. An error indicator may take a variety of forms and comprises any indication that a physical or logical error has occurred. In one embodiment, the indicators may comprise interrupts received by the processor complex 112, function calls made by controller modules, inter-process messages, status flags, and the like. Preferably, the processing system resources 310 are configured to communicate one or more error indicators to the error event analysis module 302.

The error tracking module 304 in one embodiment is configured to interface with the error event analysis module 302, error recovery module 306, and error tolerance module 308. The error tracking module 304 may include an update module configured to receive an error event notification from the error event analysis module. The update module may function substantially similar to update module 204 described in relation to FIG. 2. Other modules described in relation to the embodiment of FIG. 2 such as the threshold module 218 and management module 206 may be included in the error tracking module 304 and may be adapted to function in a modular fashion. Specifically, a threshold module 218 may be adapted to send a threshold notification to the error recovery module 306.

The error recovery module 306 selectively executes an error recovery action in response to a threshold notification. In certain embodiments, the error recovery module 306 is configured to take as many as three specific error recovery actions in relation to a resource 310. These recovery actions may correspond to different thresholds maintained for a particular counter 208. For example, in one embodiment, the error recovery module 306 recreates and reinitializes the data structures associated with a particular resource 310. This recovery action is known as a "warm start." Alternatively, the error recovery module 306 "resets" the resource 310 logically and/or physically by power cycling the resource 310. Or, the recovery action may be to "fence" the resource 310, meaning that the resource 310 is powered down and/or all communications with the resource 310 are prevented.

Because each recovery action represents a more severe way to handle the error event and causes a correspondingly increased interruption and availability impact on the CEC 108, the thresholds of a counter 208 that trigger the different recovery actions may also define progressively higher error event rates.

The error tolerance module 308 may communicate a tolerance level to the error tracking module 304. Alternatively, the error tolerance module 308 may communicate changes for an update module 204 to apply to certain counters 208. The error tracking module 304 may then adjust the threshold levels in a similar manner to that described above. The tolerance level may be substantially similar to the tolerance levels 232 described above.

Advantageously, the modular design of the error tracking module 304 in relation to the other modules permits ready shifting within an error recovery system for where different modules 302, 304, 306, and 308 execute. For example, rather than executing in the main memory 114, the error tolerance module 308 may operate within the HMC 122. Similarly, the HMC 122 may include a query module 224 similar to that described in relation to FIG. 2 to allow determination of an overall error status. Certain other error recovery functionality may be shifted to the HMC 122. For example, the HMC 122 may include logic for placing a service call based on a service call message from the error recovery module 306. In this manner, the functionality in an overall error recovery system design can be quickly adapted depending on the configuration and resources of a processing system.

Figure 4:
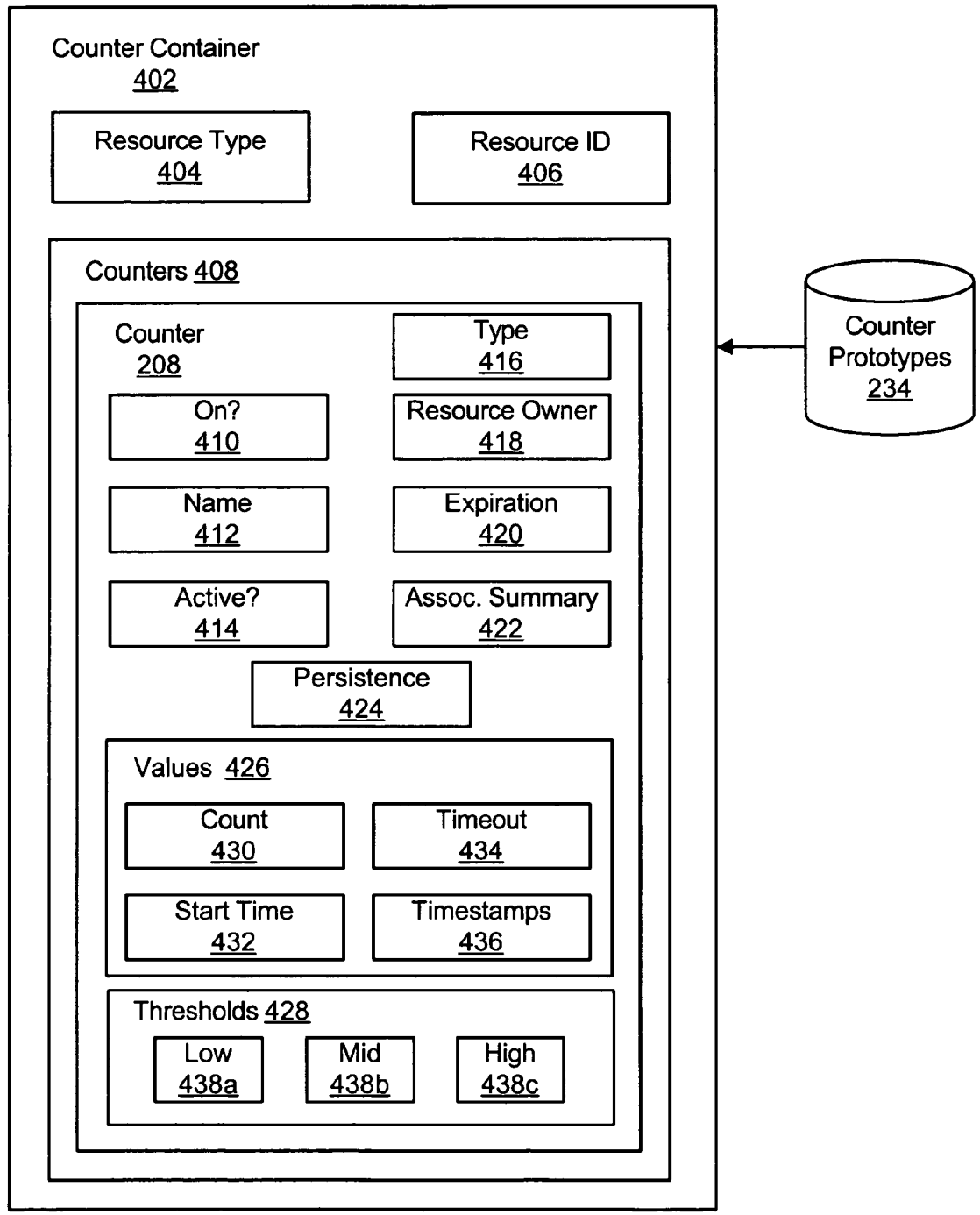
FIG. 4 is a block diagram illustrating data structures suitable for certain embodiments of the present invention.

FIG. 4 illustrates a representative example of a data structure suitable for use in an apparatus, system, or method for facilitating monitoring and responding to error events. A counter container 402 may server as a main software object for storing methods and attributes for counters 208 associated with a particular resource 210 (See FIG. 2). The counter container 402 may include a resource type 404, resource ID 406, and a counters structure 408.

The resource type 404 may comprise an attribute that defines a type of resource 210 associated with the counter container 402. For example, different resource types 404 may include, but are not limited to, resources 210 that serve as adapters, disks, or part of a networking fabric. The resource ID 406 may comprise a value that uniquely identifies a particular resource among all the resources in the processing system such as a serial number and/or part number.

The counters structure 408 comprises one or more counters 208. Preferably, the counters 208 are implemented as software objects. The counters 208 preferably correspond to a specific error event. As discussed above, certain counters 208 (summary counters 209) may provide summaries or a running tally of error events for associated counters 208. Preferably, summary counters 209 comprise a structure similar to that of regular counters 208.

The counters 208 may include a plurality of attributes and/or flags. These attributes may be object attributes or may be collected into logical groupings of related flags that provide status information regarding the counter 208. The counter 208 may include a valid attribute 410 that indicates whether the counter 208 has been programmatically activated. A name attribute 412 names the counter 208. Preferably, the name is selected by a programmer using the counter 208 and is descriptive of the failure the counter 208 tracks. An active attribute 414 indicates whether the counter 208 is idle or active. A type attribute 416 indicates whether the counter is a fixed counter or a sliding counter. Fixed and sliding counters 208 are described in relation to FIG. 5 below.

The counter 208 may also include a resource owner attribute 418 that identifies whether this counter 208 belongs to the processing system that own the memory storing the counter (i.e., a local CEC) or to a remote processing system. This is useful because, as described above, a storage module 220 may move counters 208 as needed to avoid losing the counters 208 during recovery actions such as power cycling.

An expiration attribute 420 defines when the counter 208 expires or dies. Typically, the counter 208 expires when the associated resource 210 is reset such that the counter 208 should be reset. In certain embodiment, rather than resetting counters 208 the management module 206 may destroy expired counters 208 and create a new instance of the counter 208 when the next error event occurs.

The association summary attribute 422 defines a summary counter 209 for the particular counter 208. Consequently, updates made to the counter 208 are also made to the summary counter 209 identified in the summary attribute 422. The persistence attribute 424 indicates the type of persistence the counter 208 should have. Different types of persistence may include a type preserving the counter 208 in the event of power failure, storage device failure, memory failure, power cycling, fencing, warm starts, resets, and the like. The persistence attribute 424 may be referenced by the management module 206.

Additionally, a counter 208 may include a values structure 426 and a thresholds structure 428. The values structure 426 records information regarding a count value 430, start time 432, timeout 434, and one or more timestamps 436. The count value 430 is a number representing the total number of times the error event associated with the counter 208 has occurred since the counter 208 started counting. The start time 432 indicates a time, such as a timestamp, when the counter 208 was first instructed to start counting error events. The timeout 434 indicates a time when the counter 208 is to stop counting error events. The timeout 434 may be an absolute timestamp or a time relative to the start time 432. Start time 432 and timeout 434 information may be useful in using the counter 208 for a specific period that may be programmatically initiated. For example, the counter 208 may be used to track error events during a warranty period.

The timestamps 436 structure may store a plurality of timestamps. Preferably, the number of timestamps is limited to about ten. If the counter 208 is a sliding counter 208 the timestamps may be used to count error events occurring within a time window. Sliding car counters 208 are described in more detail in relation to FIG. 5.

The thresholds structure 428 may store a plurality of thresholds 438a-c. The thresholds 438a-c define a value in relation to the count value. If the count value meets or goes above (or below) the threshold value certain recovery actions may be taken. As explained above, a plurality of thresholds 438a-c may be defined which each indicate a different level of error event severity. A count value 430 that satisfies the low threshold 438a may result in a warning being reported. A count value 430 that satisfies the high threshold 438a which is preferably greater than the low threshold 438a may result in more drastic recovery efforts such as fencing the resource 210. Preferably, the thresholds 438a-c are also related to a time interval such as minutes, hours, days, weeks, etc. Different thresholds 438a-c may have the same or different associated time intervals. In certain counters 208, the threshold may be unrelated to time. Consequently, the time interval may be set to zero or infinity as needed.

It should be noted that the various attributes of the counters 208 provides for a high degree of flexibility and more robust information that can be tracked by the counters 208. To facilitate configuring the counters 208 and to incorporate historical and empirical information, the attributes and/or objects of the counter 208 may be set based on a counter prototype 234, described above.

Figure 5:
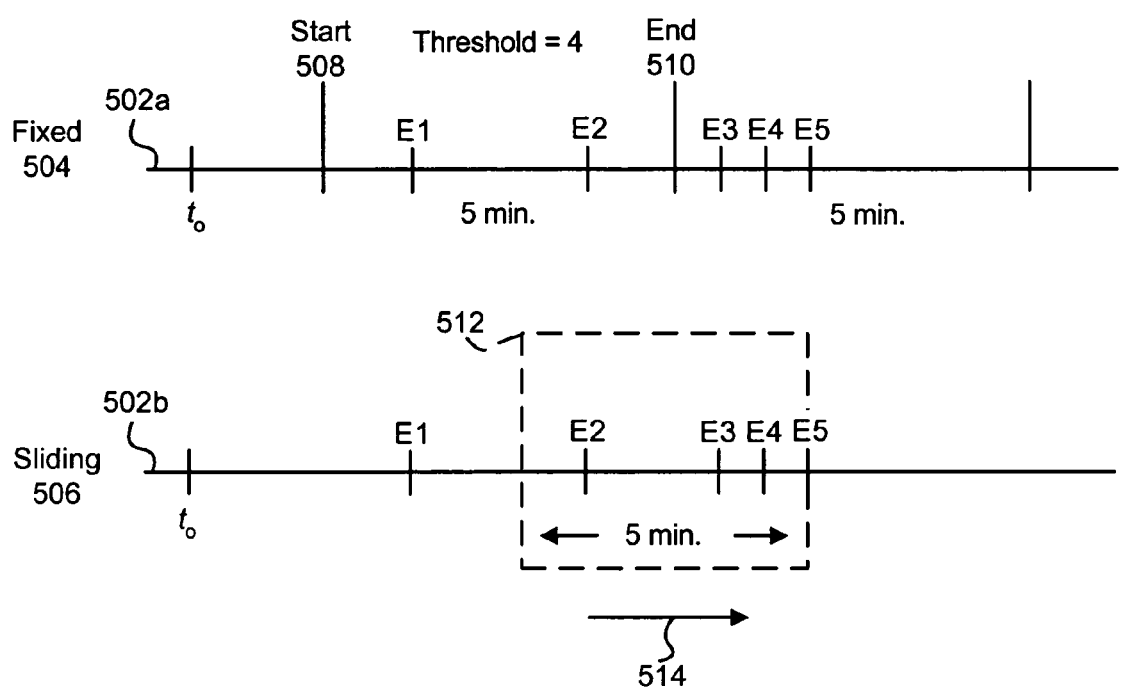
FIG. 5 is a timeline diagram illustrating two types of counters in accordance with certain embodiments of the present invention.

FIG. 5 illustrates two identical timelines 502a,b each beginning at to that are used to describe the difference between fixed counter types 504 and sliding counter types 506. Suppose the same error events E1-E5 occur at different times along the timelines 502a,b as illustrated. A fixed counter type 504 is rigid and is set along the timeline 502a based on when the counter 208 starts counting error events, the start time 508, and extends for a defined duration until the end time 510 (timeout 434 above), when the counter 208 stops counting error events.

Suppose the difference between the start time 508 and end time 510 is five minutes and that the threshold is four error events in five minutes. It should be noted that in this configuration the fixed type counter 504 fails to satisfy the threshold. Only two error events E1, E2 occurred. Even if the counter 208 restarts at the previous end time 510 for another five minute duration, the threshold is not satisfied. Four error events have not occurred in the fixed time period defined for the fixed counter type 504.

Examining error events E1-E5 indicates that there was a grouping of error events around a certain time period that the fixed counter 208 failed to detect because of the fixed start time and fixed duration. This is frequently the case when counters 208 are used to track sporadic or irregular error events. Such a problem is one of granularity and typically occurs when relatively small numbers of error events such as ten or fewer are being counted. Setting the time interval to fewer minutes or seconds may still fail to identify the four error events E2-E5 that occurred in a five minute period.

The sliding counter type 506 solves the granularity problem by counting error events within a window of time 512 that slides either as new error events occur or as time progresses. The window of time 512 is not fixed to a particular start time 508. Preferably, the sliding counter type 506 is designed to track a predefined number of error events such as ten.

In one implementation, the sliding counter type 506 uses a number of timestamps 436 corresponding to the predefined number that can be counted. This predefined number may represent a maximum value of error events, that, if reached, indicates that a recovery action should take place. The window of time 512 may be defined by a duration such as seconds, minutes, hours, etc. The time window duration may be stored with a threshold 428 or in another attribute.

As each error event occurs, its timestamp is stored in one of the slots for timestamps 436. The time window 512, in one embodiment, is measured from the most recently stored error event timestamp back in time for the time window duration. Any previous timestamps earlier than the time window duration may be discarded. Alternatively, the time window 512 may be measured into the past from the current time rather than the timestamp of the most recent error event. Consequently, as time progresses and/or more error events occur the time window 512 slides to the right in the direction of arrow 514. Timeline 502b illustrates that the sliding counter type 506 does detect four error events occurring within a five minute period. Consequently, a recovery action may be initiated.

Figure 6:
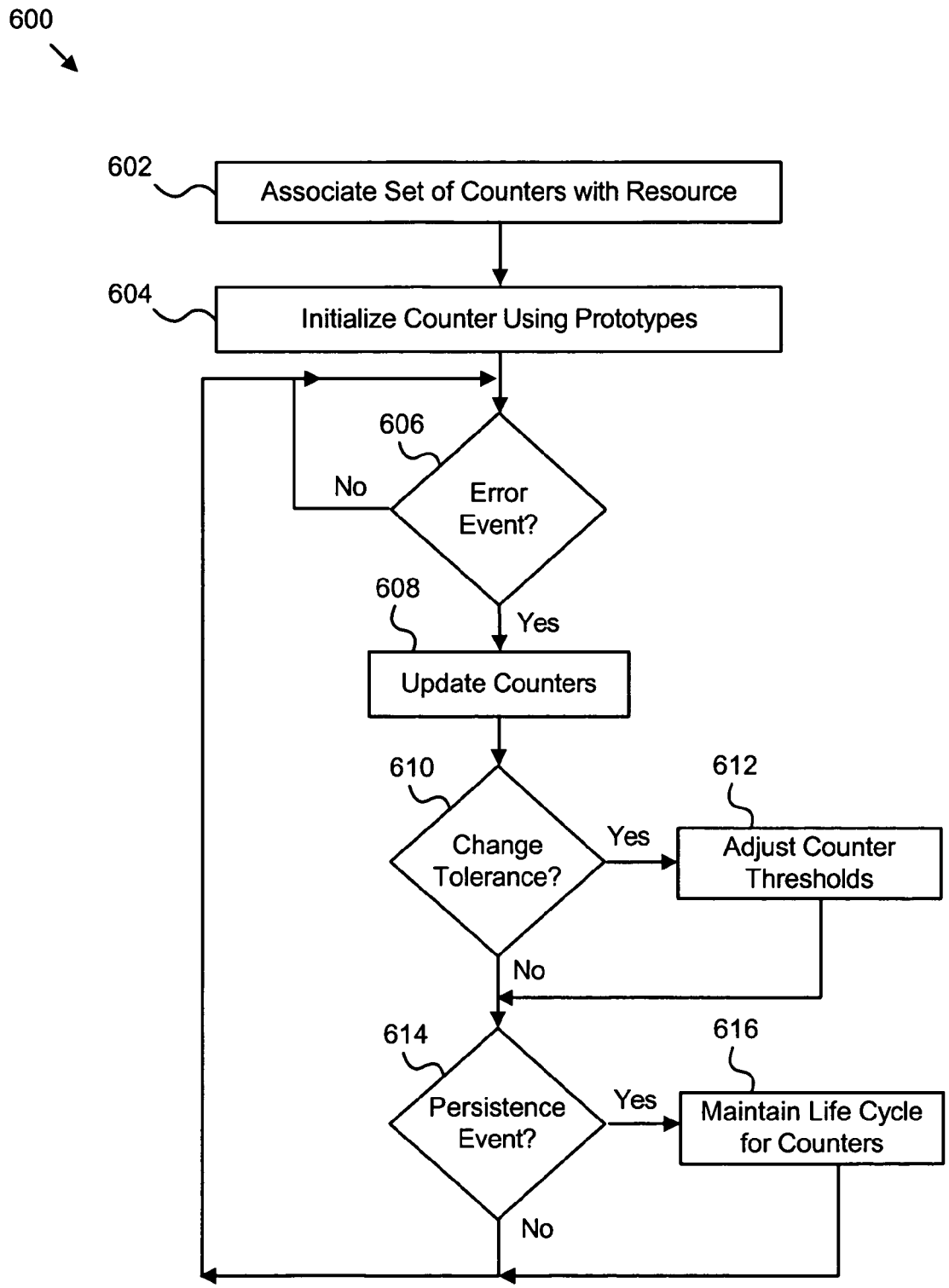
FIG. 6 is a schematic flow chart diagram illustrating one embodiment of a method to facilitate monitoring and responding to error events in accordance with the present invention.

FIG. 6 illustrates a method 600 for facilitating monitoring and responding to error events. The method 600 begins when a set of counters 208 is associated 602 with a particular resource 210. Typically, the counters 208 are programmatically associated with the resource 210, for example by software modules on a HMC 122, scripts, configuration files, or the like. Alternatively, a user interface of the HMC 122 may allow an operator to associate 602 a set of one or more counters 208 with a resource 210. The association may be accomplished by setting the resource ID 406 of a counter container 402 to a unique identifier for the resource 210. This same identifier may be included in the error event 214.

Next, an error recovery module 306 may activate one or more counters 208 in one or more counter containers 202. Specifically, the error recovery module 306 may signal the error tracking module 304 which uses the initialization module 228 to initialize 604 the one or more counters 208 using prototypes 234. The prototypes 234 provide certain default and/or initial values for the newly instantiated counters 208. Once the counters 208 are active the error tracking module 304 waits for an error event to occur.

A determination 606 is made whether an error event 214 related to any active counters 208 has occurred. If not, the error tracking module 304 continues to wait. If so, the update module 204 updates 608 the counters 208 associated with the particular error event 214. In one embodiment, a determination 610 is made whether an end-user has changed the tolerance level 232. If so, an error tolerance module 226 may adjust 612 the thresholds 428 for active counters 208 based on the error tolerance level 232.

If an end-user has not changed the tolerance level 232, a determination 614 is made whether a persistence event has occurred. A persistence event is any event that requires the management module 206 to take steps to ensure the persistence of counters 208 configured to persist. Examples of persistence events include passage of time to backup counters 208, receiving a shutdown signal, receiving a signal that memory 114 is being reset or power cycled, a recovery action has been taken, and the like. If a persistence event has occurred, the management module 206 maintains 616 the life cycle for counters 208 as appropriate. Certain counters 208 may be expired once the associated resource 210 is "warm started," "reset," or "fenced." After maintaining the life cycle or if not persistence events have occurred, the method 600 continues waiting for error events at step 606.

In summary, the present invention provides a modular tracking and counting apparatus, system and method that facilitates monitoring and responding to error events. The present invention tracks error events in relation to time. The present invention counts a plurality of error events in relation to a single hardware resource. The present invention is modular such that the error tracking module 304 may execute on various processing systems. The present invention includes counters having different threshold levels that trigger different degrees of error recovery. The present invention preserves certain counters between "warm starts," "resets," and system failures. The present invention permits end-users to adjust threshold levels indirectly based on predefined historical and empirical information available through prototypes. Finally, the present invention permits counting of error events in relation to a sliding window of time.

Many of the functional units described in this specification have been labeled as components, in order to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like.

Components may also be implemented in software for execution by various types of processors. An identified component of executable code may, for instance, comprise one or more physical or logical blocks of computer instructions which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software components, user selections, network transactions, database queries, database structures, hardware components, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance; an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for facilitating, monitoring, and responding to error events, comprising:
   a set of counters associated with a processing system resource, each counter associated with a Cyclic Redundancy Check (CRC) error event and having attributes defining a count value, one or more counter thresholds directly related to time, and empirical status information for the error event in relation to time, wherein each counter is a sliding counter configured to count error events up to a predefined number of error events within a window of time measured backwards in time from a current time;
   an update module comprising software stored on a memory device, executed by a processor complex, and configured to update one or more counters within the set in response to an error event for the processing system resource; and
   a management module comprising software stored on the memory device, executed by the processor complex, and configured to persist and maintain a life cycle for one or more counters based on the attributes the management module further comprising a storage module comprising software stored on the memory device, executed by the processor complex, and configured to selectively store a persistent copy of the counters in the set on a storage device of a redundant processing system in response to one of an error recovery action and a processing system shutdown.

2. The apparatus of claim 1, further comprising an error tolerance module comprising software stored on the memory device, executed by the processor complex, and configured to adjust the counter thresholds for one or more counters by applying a predefined factor to the counter thresholds in response to an error tolerance level set by an end-user.

3. The apparatus of claim 1, further comprising a query module comprising software stored on the memory device, executed by the processor complex, and configured to query one or more sets of counters in response to an error event query, the query directed toward a logical grouping of processing system resources.

4. The apparatus of claim 1, further comprising an initialization module comprising software stored on the memory device, executed by the processor complex, and configured to initialize the counters in accordance with pre-defined counter prototypes associated with each counter, each counter prototype based on historical, empirical, statistical information related to an error event.

5. The apparatus of claim 1, wherein the update module comprises a determination module comprising software stored on the memory device, executed by the processor complex, and configured to selectively signal one or more counters to update in response to an error event notification from an error event analysis module, the update module further comprising a threshold module configured to send a threshold notification to an error recovery module in response to satisfaction of one of the thresholds for one of the counters, the apparatus operating independent of the error event analysis module and error recovery module.

6. A system for facilitating, monitoring, and responding to error events, the system comprising:

an error event analysis module comprising software stored on a memory device, executed by a processor complex, and configured to determine a CRC error event based on one or more error indicators, the error event associated with a processing system resource;

one or more processing system resources comprising software stored on the memory device, executed by the processor complex, and configured to communicate one or more error indicators to the error event analysis module;

an error tracking module comprising an update module comprising software stored on the memory device, executed by the processor complex, and configured to receive an error event notification from the error event analysis module and update one or more counters within a set of counters associated with a processing system resource identified in the error event notification, wherein each counter is a sliding counter configured to count error events up to a predefined number of error events within a window of time measured backwards in time from a current time and comprises attributes defining the counter, a count value, one or more counter thresholds, and context information for an error event;

a threshold module comprising software stored on the memory device, executed by the processor complex, and configured to send a threshold notification to an error recovery module in response to satisfaction of one of the thresholds for one of the counters;

a management module comprising software stored on the memory device, executed by the processor complex, and configured to persist and maintain a life cycle for one or more counters based on the attributes of the counters;

an error recovery module comprising software stored on the memory device, executed by the processor complex, and configured to selectively execute an error recovery action in response to a threshold notification; and the management module further comprising a storage module comprising software stored on the memory device, executed by the processor complex, and configured to selectively store a persistent copy of the counters in the set on a storage device of a redundant processing system in response to one of the error recovery action and a processing system shutdown.

7. The system of claim 6, further comprising:

an error tolerance module comprising software stored on the memory device, executed by the processor complex, and configured to communicate with the error tracking module to adjust the counter thresholds for one or more counters to predefined values in response to an error tolerance level set by an end-user.

8. The system of claim 7, wherein the one or more counter thresholds each define a progressively higher error event rate, each counter threshold corresponding to a recovery action having a corresponding level of processing system availability impact.

9. The system of claim 8, further comprising:

an initialization module comprising software stored on the memory device, executed by the processor complex, and configured to initialize the counters in accordance with pre-defined counter prototypes associated with each counter, each counter prototype based on historical, empirical, statistical information related to an error event.

10. The system of claim 9, wherein at least one of the counters is a summary counter configured to update in response to updating of one or more associated counters, the summary counter spanning a larger scope of time than the associated counters.

11. The system of claim 10, further comprising a host management console configured to query the error tracking module to determine an overall error status for the computer processing system, to make a service call in response to a service call message from the error recovery module, and to interface with the error tolerance module in response to user input from an end-user.

12. A program of machine-readable instructions stored on a memory device, executable by a processor complex to perform operations to facilitate monitoring and responding to CRC error events, the operations comprising:

an operation to associate a set of counters with a processing system resource, wherein each counter is a sliding counter configured to count error events up to a predefined number of error events within a window of time measured backwards in time from a current time and comprises attributes defining the counter, a count value, one or more counter thresholds directly related to time, and context information for an error event;

an operation to update one or more counters within the set of counters in response to an error event for the processing system resource;

an operation to manage one or more counters such that persistence of the one or more counters is maintained in accordance with the attributes; and an operation to selectively store a persistent copy of the counters in the set on a storage device of a redundant processing system in response to one of an error recovery action and a processing system shutdown.

13. The program of claim 12, further comprising:

an operation to adjust the counter thresholds for one or more counters to predefined values in response to an error tolerance level set by an end-user.

14. The program of claim 13, wherein the one or more counter thresholds each define progressively higher error event rates per unit of time such that each counter threshold corresponds to a recovery action having a corresponding level of processing system availability impact.

15. The program of claim 14, further comprising an operation to initialize the counters in accordance with pre-defined counter prototypes associated with each counter, each counter prototype based on historical, empirical, statistical information related to an error event.

16. The program of claim 15, wherein at least one of the counters is a summary counter configured to update in response to updating of one or more associated counters.

* * * * *